United States Patent [19]
King

[11] 3,917,532
[45] Nov. 4, 1975

[54] SEWAGE TREATMENT PLANT

[75] Inventor: Donald A. King, Thomasville, Ga.

[73] Assignee: Davis Water & Waste Industries, Inc., Thomasville, Ga.

[22] Filed: Apr. 11, 1974

[21] Appl. No.: 460,200

[52] U.S. Cl. .............. 210/199; 210/220; 210/256; 210/260
[51] Int. Cl.² .................. C02B 3/04; C02C 1/12
[58] Field of Search ............... 210/2–5, 14, 210/15, 195, 197, 199, 201, 202, 220, 256, 260, 261, 519; 261/81, 121 R

[56] References Cited
UNITED STATES PATENTS

| | | | |
|---|---|---|---|
| 3,312,346 | 4/1967 | Walker | 210/195 |
| 3,415,379 | 12/1968 | Thayer | 210/195 |
| 3,448,861 | 6/1969 | Berk | 210/195 |
| 3,599,794 | 8/1971 | Schreiber et al. | 210/195 |
| 3,733,263 | 5/1973 | Mandt | 210/195 X |
| 3,809,242 | 5/1974 | Bosje | 210/195 |

*Primary Examiner*—John Adee
*Assistant Examiner*—Robert H. Spitzer
*Attorney, Agent, or Firm*—Cushman, Darby & Cushman

[57] ABSTRACT

A package sewage treatment plant, of the type having concentric inner and outer tank walls, includes an intermediate concentric wall between the inner and outer walls. The intermediate wall supports aeration piping and air diffusers for providing oxygen to and mixing of the sewage on both sides of the intermediate wall. The use of the intermediate wall makes possible the extension in size of "package" sewage treatment plants since the effective distance that rolling or mixing of the liquid can be maintained is increased. The intermediate wall also prevents short-circuiting of the sewage from the inlet to the settling tank.

10 Claims, 5 Drawing Figures

SEWAGE TREATMENT PLANT

BACKGROUND AND SUMMARY OF THE INVENTION

The present invention generally relates to aerobic sewage treatment systems and, in particular, to an improved tank arrangement in the type of system which employs a central sludge settling tank surrounded by an annular outer tank where aeration and digestion of the sewage occurs.

Prior art package sewage treatment plants over which the present invention is an improvement are are shown in U.S. Pat. Nos. 3,415,379, 3,599,794, 3,649,529 and 3,744,634.

Package sewage treatment plants of the above-summarized type are easily erected in the field, relatively inexpensive to manufacture and install, and require relatively little maintenance, therefore, their use for small municipalities is greatly desired. The capacity of treatment plants of this type, in terms of volume of sewage treated per unit of time, tends to be limited by the ability of air diffusers to achieve adequate mixing of the sewage by the air injected into the outer tank through diffusers. With air diffusers mounted on the outside of the settling tank wall, as is conventional, the distance between the settling tank wall and the outer plant wall and hence the handling capacity cannot exceed certain practical limits. But, by employing an intermediate wall within the outer tank, according to the teachings or the present invention, the effective distance between the settling tank wall and the outer plant wall is increased, allowing an extension in the capacity of package sewage treatment plants. A typical plant of conventional design may have a practical limit of 1.5 million gallons per day. The arrangement of the present invention is capable of handling in excess of 2 million gallons per day.

It is, therefore, the principle object of the present invention to provide a sewage treatment plant of the concentric tank type with an improved tank arrangement which increases the handling capacity of the plant.

DETAILED DESCRIPTION OF THE INVENTION

Figure 1:
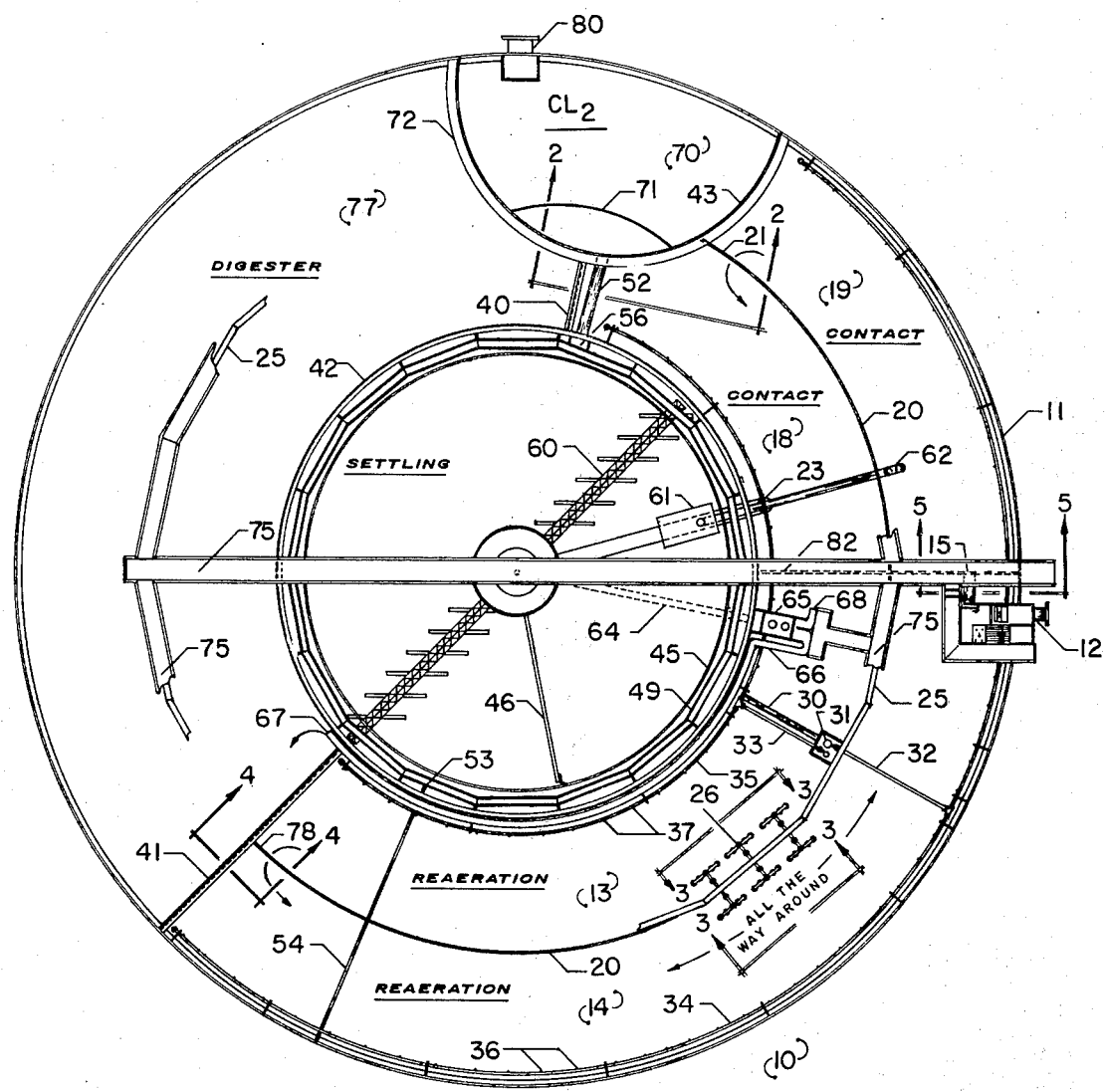
FIG. 1 is a plan view of the treatment plant according to the teachings of the present invention, with some portions cut away for clarity.

A package sewage treatment plant adapted to be easily erected in the field is generally depicted at 10 in FIG. 1. The treatment plant includes an outer cylindrical tank wall 11 and a concentric settling tank wall 42. The space between there two cylindrical walls is normally divided into contact and reaeration areas in an aeration section, a digester section and a chlorine contact section.

Sewage to be treated enters the plant 10 at a plant inlet 12. An intermediate wall, shown generally at 20 and formed of arcuate sections, divides the contact and reaeration areas of the aeration section into inner and outer arcuate portions 13 and 18 and 14 and 19, respectively. The intermediate wall 20 extends only as far as vertical radial walls 40 and 41, and does not extend into the digester section. The sewage enters the contact area 19 of the aeration section of the tank through opening 15. The sewage activated sludge mixture flows in a counter-clockwise direction in outer arcuate portion 19 from the influent point 15.

Figure 2:
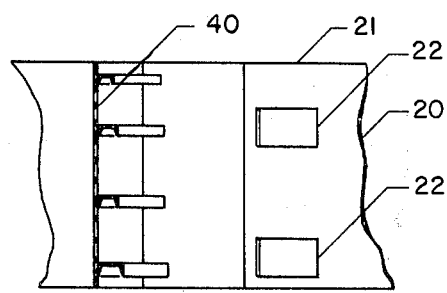
FIG. 2 is a sectional view taken along lines 2—2 in FIG. 1.

Communication is provided between outer section 19 and inner section 18 through holes 22 formed in end portion 21 of the intermediate wall 20, as shown in FIG. 2. Sewage from the outer arcuate portion 19 is thus allowed to pass through the end portion 21 of intermediate wall 20 near wall 40, as shown by the arrows, to reach a settling tank inlet 23.

Figure 3:
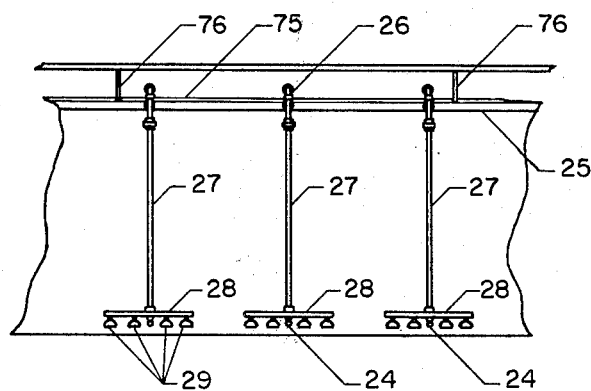
FIG. 3 is a sectional view front elevational view taken along lines 3—3 in FIG. 1.

As long as the sewage and activated sludge remain in the contact or reaeration areas, air is injected to provide oxygen for the microorganisms that break down the organic material in the sewage, and also to provide adequate mixing to bring the microorganisms, organic material and oxygen into intimate contact and to keep sludge from settling in the aeration areas. As shown in FIGS. 1 and 3, air is supplied from blowers (not shown) to an air header 25 mounted on the intermediate wall 20. The air header 25 form a full circle around the plant providing air to the digester 77 as well as the contact and reaeration areas. Air flows from the header 25 through descending pipes 27 to conventional air diffusers 26 having spaced injector portions 29. The air header 25 and air diffusers 26 can be mounted on intermediate wall 20 in any suitable manner. In the preferred embodiment, brackets 24 mount diffusers 26 on wall 20 near — but spaced from — the bottom of the tank (usually about 2 feet). The injector portions are so located to prevent clogging thereof while allowing maximum mixing.

As the air bubbles injected through the injector portions 29 rises, they impart energy to the liquid in the tank causing it to roll from intermediate wall 20 to the outer wall 11, and from intermediate wall 20 to the settling tank wall 42. Since the size of the treatment plant — the distance from the settling tank wall 42 to the outer wall 11 — is limited by the distance that this rolling or mixing can be maintained, it is apparent that the provision of the intermediate wall 20 according to the teachings of the present invention, makes possible the extension of the size of package treatment plants since rolling need be maintained only in the distances between the intermediate wall 20 and the inner and outer walls rather than in the larger distance from the inner wall to the outer wall. In addition to providing this advantageous result, the intermediate wall 20 also provides support for the aeration piping 25, 27 and prevents short-circuiting of the sewage from the plant inlet 12 to the settling tank inlet 23.

In order to effectively dissipate the froth that is created in the aeration section, a pipe 30 brings liquid from the settling tank to a froth spray pump 31, which supplies the liquid to froth spray nozzles 36, 37 through pipes 32, 34 and 33, 35, respectively.

The settling tank has a skimmer arm 46 cooperating with scum baffle 45 to help prevent scum build-up on the surface of the settling tank. Scum box 61 communicates through scum return 62 with the contact area of the aeration section of the plant to eject scum from the settling tank. A rotating scraper mechanism 60 collects settled sludge from the bottom of the settling tank. Collected sludge is returned from the settling tank to the reaeration section of the plant via sludge return pipe 64, box 65 and opening 68. Waste sludge from the settling tank also is distributed to the digester portion of the plant through sludge return pipe 64, box 65, conduit 66 and opening 67, as shown by the arrows. Sludge can be removed from the settling tank bottom by any conventional means.

Sludge returned from the settling tank is discharged into the inner reaeration area 13 and flows in a clockwise direction from sludge discharge point 68 to the vertical radial division wall 41.

Figure 4:
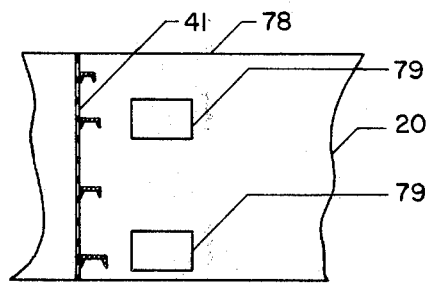
FIG. 4 is a sectional view taken along lines 4—4 in FIG. 1.

Communication is provided between outer section 14 and inner section 13 through holes 79 formed in end portion 78 of the intermediate wall 20, as shown in FIG. 4. Sludge from the inner section 13 is allowed to pass through the end portion 78 of intermediate wall 20 near wall 41, as shown by the arrows, into the outer section 14. The sludge then flows in a counterclockwise direction in outer section 14 to the vertical radial division wall 82.

Figure 5:
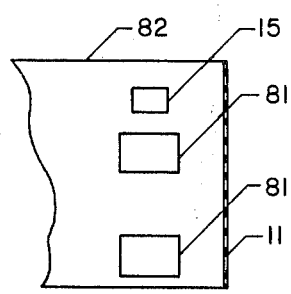
FIG. 5 is a sectional view taken along lines 5—5 in FIG. 1.

Communication is provided between outer section 19 and outer section 14 through holes 81 formed in the vertical radial division wall 82, as shown in FIG. 5. Sludge from the outer section 14 is allowed to pass through the vertical radial division wall 82 into the outer section 19 beginning a new treatment cycle.

Clear effluent from the settling tank flows under a scum baffle 45 and overflows into a trough 49 for eventual discharge into a chlorine contact tank 70 via a settling tank effluent pipe 52. Chlorine is injected via a pipe 54 into a trough 49 at a point 53 — the point of the trough 49 furthest from a duct 56 leading to settling tank effluent pipe 52 — in order to provide the greatest time of contact between the chlorine and the effluent before the effluent is discharged.

The chlorine contact tank 70 is enclosed by an arcuate wall 43 and the outer plant wall 11. Underflow and splash baffles, 71 and 72, respectively, may be provided. The relatively unobjectionable liquid in tank 70 is finally discharged through plant effluent pipe 80.

A walkway 75 may be provided for manual inspection of all portions of the plant. If the walkway 75 is provided over intermediate wall 20, it may be supported thereby by a bracket, such as bracket 76 in FIG. 3.

It is apparent that many modifications of the present invention are possible. For instance, the intermediate wall of the present invention could be used with a treatment plant not having a digester section, in which case the intermediate wall would extend substantially 360°. In addition, the intermediate wall could be formed of flat panels rather than arcuate sections, and air diffusers 26 could be mounted thereon in any other suitable manner. Also, communication could be provided between inner and outer portions 13 and 18 and 14 and 19 of the aeration sections of the plant by means other than holes in the end sections of the intermediate wall.

It is thus apparent that an improved package sewage treatment plant accomplishing all of the objectives of the invention has been disclosed. Although the invention has been herein shown and described in what is conceived to be the most practical and preferred embodiments, it is recognized that departures may be made therefrom within the scope of the invention which is not to be limited to details disclosed but is to be accorded the full scope of the claims so as to embrace any and all equivalent structures and devices.

What is claimed is:

1. A sewage treatment plant comprising:
   a. an outer curved wall and an inner curved settling tank wall defining an aeration section therebetween, said walls having a common center,
   b. means for facilitating increased sewage capacity of said plant while providing adequate mixing of sewage by air injected into the sewage, said means including (i) a curved intermediate wall located between said inner and outer walls in said aeration section, said intermediate wall having a common center with said inner and outer walls and having inner and outer surfaces thereof facing, respectively, said inner and outer walls, (ii) air diffuser means for providing rolling of sewage in said aeration section, from the intermediate wall toward the outer wall and from the intermediate wall toward the inner wall, said air diffuser means including a plurality of air diffusers mounted on both said inner and outer surfaces of said intermediate wall,
   c. generally radially extending wall means for terminating the ends of the intermediate wall, and
   d. means for providing limited sewage communication between the areas defined by said intermediate wall and said outer wall and said intermediate wall and said inner wall for preventing shortcircuiting of sewage from a plant influent to a settling tank influent.

2. A sewage treatment plant as recited in claim 1 wherein said air diffuser means further include air header means for supplying air to said plurality of air diffusers, said air header means mounted on top of said intermediate wall.

3. A sewage treatment plant as recited in claim 2 wherein said means for providing limited sewage communication includes said intermediate wall and portions of said intermediate wall remote from said settling tank influent having apertures therein.

4. A sewage treatment plant as recited in claim 3 wherein said inner, intermediate and outer walls define circumferences of concentric circles.

5. A sewage treatment plant as recited in claim 4 wherein said intermediate wall is formed from arcuate wall members.

6. A sewage treatment plant as recited in claim 1 wherein said inner and outer walls also form a digester section therebetween, said intermediate wall extending up to but not into said digester section.

7. A sewage treatment plant as recited in claim 6 wherein a chlorine contact tank is additionally formed by walls between said inner and outer walls, said intermediate wall extending up to but not into said chlorine contact tank.

8. A sewage treatment plant as recited in claim 6 wherein said inner, intermediate and outer walls define circumferences of concentric circles, said digester section being separated from said aeration section by walls radially extending between said inner and outer walls.

9. A sewage treatment plant as recited in claim 1 wherein said air diffusers are mounted near but spaced from the bottom of said plant and said intermediate wall.

10. A sewage treatment plant as recited in claim 1 wherein said means for providing limited sewage communication includes said intermediate wall and portions of said intermediate wall remote from said settling tank influent having apertures therein.

* * * * *